US010711190B2

(12) United States Patent
Ono

(10) Patent No.: US 10,711,190 B2
(45) Date of Patent: Jul. 14, 2020

(54) CORE-SHELL PARTICLES, METHOD FOR PRODUCING CORE-SHELL PARTICLES, AND FILM

(71) Applicant: FUJIFILM Corporation, Tokyo (JP)

(72) Inventor: Masashi Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 467 days.

(21) Appl. No.: 15/592,800

(22) Filed: May 11, 2017

(65) Prior Publication Data

US 2017/0247613 A1 Aug. 31, 2017

Related U.S. Application Data

(63) Continuation of application No. PCT/JP2015/082381, filed on Nov. 18, 2015.

(30) Foreign Application Priority Data

Nov. 20, 2014 (JP) ................. 2014-235293

(51) Int. Cl.
C09K 11/70 (2006.01)
B82Y 40/00 (2011.01)
C09K 11/74 (2006.01)
C09K 11/02 (2006.01)
C01G 15/00 (2006.01)
C09K 11/56 (2006.01)
B82Y 20/00 (2011.01)

(52) U.S. Cl.
CPC ............ *C09K 11/703* (2013.01); *B82Y 40/00* (2013.01); *C01G 15/00* (2013.01); *C09K 11/025* (2013.01); *C09K 11/565* (2013.01); *C09K 11/7492* (2013.01); *B82Y 20/00* (2013.01); *C01P 2002/74* (2013.01); *C01P 2004/64* (2013.01); *C01P 2004/80* (2013.01); *Y10S 977/774* (2013.01); *Y10S 977/818* (2013.01); *Y10S 977/824* (2013.01); *Y10S 977/892* (2013.01); *Y10S 977/896* (2013.01); *Y10S 977/95* (2013.01)

(58) Field of Classification Search
CPC ....... C09K 11/70; C09K 11/703; B82Y 40/00; B82Y 20/00; Y10S 977/774; Y10S 977/818; Y10S 977/824; Y10S 977/892; Y10S 977/896; Y10S 977/95

USPC ......................................................... 252/301
See application file for complete search history.

(56) References Cited

U.S. PATENT DOCUMENTS

2009/0315446 A1 12/2009 Murase et al.

FOREIGN PATENT DOCUMENTS

JP 2010-138367 A 6/2010
JP 2012-144587 A 8/2012

OTHER PUBLICATIONS

Communication dated May 16, 2018 from the Korean Intellectual Property Office in counterpart Korean application No. 10-2017-7013092.
Virieux Heloise et al.; "InP/ZnS Nanocrystals: Coupling NMR and XPS for Fine Surface and Interface Description"; Journal of the American Chemical Society; Nov. 6, 2012; pp. 19701-19708, vol. 134.
Xu Shu et al.; "Rapid Synthesis of Highly Luminescent InP and InP/ZnS Nanocrystals"; Journal of Materials Chemistry; May 16, 2008; pp. 2653-2656; vol. 18.
Song Woo-Seuk et al.; "Amine-Derived Synthetic Approach to Color-Tunable InP/ZnS Quantum Dots with High Fluorescent Qualities"; Journal of Nanoparticle Research; Jun. 7, 2013; pp. 1388-0764, vol. 15.
International Search Report for application No. PCT/JP2015/082381 dated Dec. 28, 2015.
Written Opinion for application No. PCT/JP2015/082381 dated Dec. 28, 2015.
Communication dated Sep. 29, 2019, from The State Intellectual Property Office of the P.R. of China in counterpart Application No. 201580060597.1.
Communication dated Jun. 5, 2018 from the Japanese Patent Office in counterpart Application No. 2016-560262.

*Primary Examiner* — Edward M Johnson
(74) *Attorney, Agent, or Firm* — Sughrue Mion, PLLC

(57) ABSTRACT

Provided are core-shell particles that have high luminous efficiency and are useful as quantum dots, a method for producing the same, and a film produced using the core-shell particles. The core-shell particles of the invention are core-shell particles having a core containing a Group III element and a Group V element; and a shell covering at least a portion of the surface of the core and containing a Group II element and a Group VI element, in which the proportion of the peak intensity ratio of the Group II element with respect to the peak intensity ratio of the Group III element as measured by X-ray photoelectron spectroscopy analysis is 0.25 or higher.

20 Claims, No Drawings

CORE-SHELL PARTICLES, METHOD FOR PRODUCING CORE-SHELL PARTICLES, AND FILM

CROSS-REFERENCE TO RELATED APPLICATIONS

This application is a Continuation of PCT International Application No. PCT/JP2015/082381 filed on Nov. 18, 2015, which claims priority under 35 U.S.C. § 119(a) to Japanese Patent Application No. 2014-235293 filed on Nov. 20, 2014. The above application is hereby expressly incorporated by reference, in its entirety, into the present application.

BACKGROUND OF THE INVENTION

1. Field of the Invention

The present invention relates to core-shell particles, a method for producing the same, and a film containing core-shell particles.

2. Description of the Related Art

Regarding semiconductor fine particles that are expected to be applicable to colloidal semiconductor nanoparticles (so-called quantum dots), Group II-VI semiconductor fine particles, Group III-V semiconductor fine particles, and the like are hitherto known.

The particle size of these semiconductor fine particles is from about several nanometers to several dozen nanometers.

Also, such nano-scale particles generally have larger band gaps as the particle size becomes smaller due to the so-called quantum size effect, and the nano-scale particles emit light in short wavelength regions such as the ultraviolet region and the near ultraviolet region.

Accordingly, research and development has been conducted on the application of such semiconductor fine particles to a variety of devices such as piezoelectric elements, electronic devices, luminescent elements, and lasers, so as to make the best use of the optical characteristics unique to the semiconductor fine particles.

For example, nanoparticles containing InP in the core and ZnS in the shell, which function as quantum dots that do not contain Cd or Pd, are described in W. S. Song et al, "Amine-derived synthetic approach to color-tunable InP/ZnS quantum dots with high fluorescent qualities", J Nanopart Res (2013) 15:1750.

Furthermore, JP2010-138367A describes "nanoparticles having a diameter of 2.5 to 10 nanometers, the nanoparticles having a core/shell structure composed of a core containing a Group III element and a Group V element, and a shell containing a Group II element and a Group VI element and having a thickness of from 0.2 nanometers to 4 nanometers, in which the molar ratio of the Group III element to the Group V element is 1.25 to 3.0, and the fluorescent light emission efficiency is 10% or higher" ([Claim 1]). Specifically, this patent document describes nanoparticles containing InP in the core and ZnS in the shell ([Claim 6]).

JP2012-144587A also describes "a method for producing compound semiconductor particles, the method including producing a first solution by dissolving a first raw material including an In component and a second raw material including an Zn component; producing a second solution by dissolving a third raw material including a P component and a fourth raw material including a S component; and producing compound semiconductor particles of compositized InP and ZnS by bringing the first solution and the second solution into contact with each other" ([Claim 1]). This patent document describes an embodiment in which the mixing ratio between the In component and the Zn component is set to 9/1 to 1/9 as a molar ratio ([Claim 7] and [0053]).

SUMMARY OF THE INVENTION

The inventors of the invention conducted investigations on the particles described in JP2010-138367A, JP2012-144587A, and W. S. Song et al, "Amine-derived synthetic approach to color-tunable InP/ZnS quantum dots with high fluorescent qualities", J Nanopart Res (2013) 15:1750, and they found that the luminous efficiency may be deteriorated depending on the synthesis process (for example, raw materials, reaction temperature, and reaction time).

Thus, it is an object of the invention to provide core-shell particles that have high luminous efficiency and are useful as quantum dots, a method for producing the same, and a film produced using core-shell particles.

The inventors of the invention conducted a thorough investigation order to achieve the object described above, and as a result, the inventors found that when core-shell particles have a core formed from a Group III-V semiconductor and a shell formed from a Group II-VI semiconductor, and the ratio of the peak intensity ratios between the Group III element included in the core and the Group II element included in the shell has a predetermined value, the luminous efficiency is improved. Thus, the inventors completed the invention.

That is, the inventors found that the object described above can be achieved by the following configurations.

[1] Core-shell particles comprising a core containing, a Group III element and a Group V element; and a shell covering at least a portion of the surface of the core and containing a Group II element and a Group VI element, wherein the proportion of the peak intensity ratio of the Group II element with respect to the peak intensity ratio of the Group III element as measured by X-ray photoelectron spectroscopy analysis is 0.25 or higher.

[2] The core-shell particles according to [1], wherein the proportion of the peak intensity ratio of the Group VI element with respect to the peak intensity ratio of the Group III element as measured by X-ray photoelectron spectroscopy analysis is 0.80 or higher.

[3] The core-shell particles according to [1] or [2], wherein the Group III element is In, and the Group V element is any one of P, N, and As.

[4] The core-shell particles according to [3], wherein the Group III is In, and the Group V element is P.

[5] The core-shell particles according to any one of [1] to [4], wherein the Group II element is Zn, and the Group VI element is S or Se.

[6] The core-shell particles according to [5], wherein the Group II element is Zn, and the Group VI element is S.

[7] The core-shell particles according to any one of [1] to [6], wherein the proportion of the peak intensity ratio of the Group II element with respect to the peak intensity ratio of the Group III element as measured by X-ray photoelectron spectroscopy analysis is 0.35 or higher.

[8] A method for producing core-shell particles, the method being used for synthesizing the core-shell particles according to any one of [1] to [7], the method comprising:

a first step of preparing a mixed solution by mixing a Group III raw material including a Group III element with a Group II raw material including a Group II element, and dissolving the raw materials;

a second step of adding a Group V raw material including a Group V element to the mixed solution, and forming a core containing the Group III element and the Group V element; and a third step of adding a Group VI raw material including a Group VI element to the mixed solution after forming of the core, and forming a shell containing, the Group II element and the Group VI element on at least a portion of the surface of the core, wherein the third step is carried out at a temperature of 230° C. or higher.

[9] The method for producing core-shell particles according to [8], wherein the second step is carried out at a temperature of lower than 230° C.

[10] The method for producing core-shell particles according to [9], wherein the second step is carried out at a temperature of from 120° C. to 200° C.

[11] The method for producing core-shell particles according to any one of [8] to [10], wherein the third step is carried out at a temperature of 240° C. or higher.

[12] The method for producing core-shell particles according to any one of [8] to [11], wherein the Group III element is In, and the Group V element is any one of P, N, and As.

[13] The method for producing core-shell particles according to [12], wherein the Group III element is In, and the Group V element is P.

[14] The method for producing core-shell particles according to any one of [8] to [13], wherein the Group II element is Zn, and the Group VI element is S or Se.

[15] The method for producing core-shell particles according to [14], wherein the Group II element is Zn, and the Group VI element is S.

[16] The method for producing core-shell particles according to any one of [8] to [15], wherein the Group III raw material is chloride of In.

[17] The method for producing core-shell particles according to any one of [8] to [16], wherein the Group II raw material is chloride of Zn.

[18] The method for producing core-shell particles according to any one of [8] to [17], wherein the Group V raw material is a trisdialkylaminophosphine.

[19] The method for producing core-shell particles according to any one of [8] to [18], wherein the Group VI raw material is an alkylthiol.

[20] A film comprising the core-shell particles according to any one of [1] to [7].

According to the invention, core-shell particles that have high luminous efficiency and are useful as quantum dots, a method for producing the same, and a film produced using core-shell particles, can be provided.

DESCRIPTION OF THE PREFERRED EMBODIMENTS

Hereinafter, the invention will be described in detail.

The explanation on the configuration requirements described below is based on representative embodiments of the invention; however, the invention is not intended to be limited to such embodiments.

According to the present specification, the numerical value range indicated using the symbol "~" means a range including the numerical values described before and after the symbol "~" as the lower limit and the upper limit.

Core-Shell Particles

The core-shell particles of the invention are core-shell particles having a core containing a Group III element and a Group V element, and a shell covering at least a portion of the surface of the core and containing a Group II element and a Group VI element.

Furthermore, the core-shell particles of the invention are such that the proportion of the peak intensity ratio B of the Group II element with respect to the peak intensity ratio A of the Group III element [hereinafter, also referred to as "intensity ratio (B/A)"] as measured by an X-ray photoelectron spectroscopy (hereinafter, also referred to as "XPS") analysis, is 0.25 or higher.

Here, according to the invention, the peak intensity ratio obtainable by an XPS analysis refers to the integrated intensity obtained by subtracting the background from a peak observed under the following measurement conditions, and integrating the area of the peak relative to energy.

Furthermore, the measurement of the peak intensity ratio by an XPS analysis is performed under the following measurement conditions, using a sample obtained by applying a dispersion liquid containing core-shell particles (solvent: toluene) on a non-doped Si substrate and drying the dispersion liquid.

Measurement Conditions

Measuring apparatus: Quantera SXM type ESCA manufactured by Ulvac-Phi, Inc.

X-ray source: Al-Kα radiation (analyzed diameter 100 μm, 25 W, 15 kV)

Photoelectron discharge angle: 45°

Measurement range: 300 μm×300 μm

Compensation: Charging compensation for combined use of an electron gun and a low energy ion gun Measured elements (measured orbitals): C (1s), N (1s), O (1s), Si (2p), P (2p), S (2p), Cl (2p), Zn (2p3/2), Ga (2p3/2), In (3d5/2)

The core-shell particles of the invention has an intensity ratio (B/A) of 0.25 or higher, and therefore, the luminous efficiency is improved.

The reason why the luminous efficiency is improved as such is not clearly known; however, it is speculated that the reason is roughly as follows.

First, if the intensity ratio (B/A) is less than 0.25, in other words, if the peak intensity ratio A of the Group III element included in the core is large, the shell is formed non-uniformly or insufficiently, and the signal intensity from the core becomes relatively strong. Therefore, it is considered that the luminous efficiency is inferior. This can also be expected from the results of the Comparative Examples that will be described below.

For this reason, the core-shell particles of the invention, having an intensity ratio (B/A) of 0.25 or higher, have the core covered by the shell uniformly or sufficiently, and the signal intensity from the core is relatively suppressed. Therefore, it is considered that the luminous efficiency is enhanced.

According to the invention, it is preferable that the intensity ratio (B/A) is 0.35 or higher, because the luminous efficiency is further improved.

Furthermore, from the viewpoint of dispersibility of the core-shell particles and the like, it is preferable that the intensity ratio (B/A) is 10 or lower.

Core

The core of the core-shell particles of the invention is formed from a so-called Group III-V semiconductor, which contains a Group III element and a Group V element.

Group III Element

Specific examples of the Group III element include indium (In), aluminum (Al), and gallium (Ga), and among them, the Group III element is preferably In.

Group V Element

Specific examples of the Group V element include phosphorus (P), nitrogen (N), and arsenic (As), and among them, the Group V element is preferably P.

According to the invention, a Group III-V semiconductor obtained by appropriately combining the above-mentioned examples of the Group III element and the Group V element can be used for the core; however, the Group III-V semiconductor is preferably InP, InN, or InAs. Also, for the reason that the luminous efficiency is further increased, and a satisfactory luminescence half-width can be easily obtained, the Group III-V semiconductor is more preferably InP.

Shell

The shell of the core-shell particles of the invention is a material covering at least a portion of the surface of the core, and is formed from a so-called Group II-VI semiconductor containing a Group II element and a Group VI element.

Here, according to the invention, whether the shell covers at least a portion of the surface of the core can be checked by, for example, a composition distribution analysis based on energy dispersive X-ray spectroscopy (TEM-EDX) using a transmission electron microscope; however, as is obvious from comparisons of Examples and Comparative Examples as will be described below, when the above-mentioned intensity ratio (B/A) is 0.25 or higher, the requirement is necessarily satisfied.

Group II Element

Specific examples of the Group II element include zinc (Zn), cadmium (Cd), and magnesium (Mg), and among them, the Group II element is preferably Zn.

Group VI Element

Specific examples of the Group VI element include sulfur (S), oxygen (O), selenium (Se), and tellurium (Te), and among them, the Group VI element is preferably S or Se, and more preferably S.

According to the invention, a Group II-VI semiconductor obtained by appropriately combining the above-mentioned examples of the Group II element and the Group VI element can be used for the shell; however, it is preferable that the shell is a crystal system identical with or similar to the core.

Specifically, the Group II-VI semiconductor is preferably ZnS or ZnSe, and from the viewpoint of safety and the like, the Group II-VI semiconductor is more preferably ZnS.

Coordinating Molecule

It is desirable that the core-shell particles of the invention have coordinating molecules on the surface, from the viewpoint of imparting dispersibility and reducing surface defects.

From the viewpoints of dispersibility in a non-polar solvent or the like, it is preferable that the coordinating molecule includes an aliphatic hydrocarbon.

Furthermore, from the viewpoint of enhancing dispersibility, the coordinating molecule is preferably a ligand having a main chain with at least 6 or more carbon atoms, and more preferably a ligand having a main chain with 10 or more carbon atoms.

Such a coordinating molecule may be a saturated compound, or may be an unsaturated compound, and specific examples include decanoic acid, lauric acid, myristic acid, palmitic acid, stearic acid, behenic acid, oleic acid, erucic acid, oleylamine, dodecylamine, dodecanethiol, 1,2-hexadecanethiol, trioctylphosphine oxide, and cetrimonium bromide. These may be used singly, or two or more kinds thereof may be used in combination.

Among these, it is desirable to use an amine-based compound that does not contain an oxygen atom, such as oleylamine or dodecylamine, because these compounds do not inhibit production of a Group III-V semiconductor and suppress formation of oxides, and satisfactory semiconductor crystals are obtained even in a case in which less reactive Group V raw materials (for example, a trisdialkylaminophosphine) are used.

Other Intensity Ratio

In regard to the core-shell particles of the invention, from the viewpoint that the luminous efficiency is further improved, the proportion (C/A) of the peak intensity ratio C of the Group VI element with respect to the peak intensity ratio A of the Group III element as measured by an XPS analysis is preferably 0.80 or higher, more preferably 0.90 or higher, and even more preferably 1.2 or higher.

Average Particle Size

In regard to the core-shell particles of the invention, from the viewpoint that particles having a uniform size can be synthesized easily, and the control of the emitted light wavelength based on the quantum size effect is facilitated, the average particle size is preferably 2 nm or more, and more preferably 10 nm or less.

Here, the average particle size refers to a value obtained by directly observing at least 20 particles with a transmission electron microscope, calculating the diameter of a circle having the same area as the projected area of each of the particles, and calculating the arithmetic mean of those values.

Method for Producing Core-Shell Particles

The method for producing core-shell particles, by which the core-shell particles of the invention as described above are synthesized (hereinafter, also referred to as "production method of the invention"), is a method for producing core-shell particles, the method including: a first step of preparing a mixed solution by mixing a Group III raw material including a Group III element with a Group II raw material including a Group II element, and dissolving the raw materials; a second step of adding a Group V raw material including a Group V element to the mixed solution, and forming a core containing the Group III element and the Group V element; and a third step of adding a Group VI raw material including a Group VI element to the mixed solution after forming of the core, and forming a shell containing the Group II element and the Group VI element on at least a portion of the surface of the core, in which the third step is carried out at a temperature of 230° C. or higher.

Here, in regard to the Group II element, Group III element, Group V element, and Group VI element, these elements are similar to those described above in connection with the core-shell particles of the invention.

In the following description, the raw materials and conditions for various treatment steps will be described in detail.

First Step

The first step is a step of preparing a mixed solution by mixing a Group III raw material including a Group III element with a Group II raw material including a Group II element, and dissolving the raw materials.

In regard to the production method of the invention, from the viewpoint of forming the above-mentioned coordinating molecules on the surfaces of the core-shell particles thus obtainable in the first step, an embodiment of adding a Group III raw material and a Group II raw material to a solution containing the above-mentioned coordinating molecules, and dissolving the raw materials, is preferred.

Group III Raw Material

Specific examples of the Group III raw material including a Group III element include indium chloride, indium oxide, indium nitrate, indium sulfate, indium acid; aluminum phosphate, aluminum acetylacetonate, aluminum chloride, aluminum fluoride, aluminum oxide, aluminum nitrate, aluminum sulfate; gallium acetylacetonate, gallium chloride, gallium fluoride, gallium oxide, gallium nitrate, and gallium sulfate.

Among these, from the viewpoint that even in a case in which a less reactive Group V raw material (for example, a trisdialkylaminophosphine) is used, satisfactory semiconductor crystals (core) are obtained, and oxidation does not easily occur, it is preferable to use indium chloride, which is chloride of In.

Group II Raw Material

Specific examples of the Group II raw material including a Group II element include dimethylzinc, diethylzinc, a zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, and zinc sulfate.

Among these, from the viewpoint that oxidation does not easily occur, and the compatibility with the optional coordinating molecule that will be described below, or solubility in a non-polar solvent is relatively high, it is preferable to use zinc chloride, which is chloride of Zn.

Coordinating Molecule

In a case in which the coordinating molecule described above is employed together with the Group III raw material and the Group II raw material described above in the first step, it is desirable, as described above, to use an amine-based compound that does not contain an oxygen atom, such as oleylamine or dodecylamine.

Non-Polar Solvent

In regard to the production method of the invention, it is preferable to use a non-polar solvent together with the Group III raw material Group II raw material described above and an optional coordinating molecule in the first step.

Specific examples of the non-polar solvent include aliphatic saturated hydrocarbons such as n-decane, n-dodecane, n-hexadecane, and n-octadecane; aliphatic unsaturated hydrocarbons such as 1-undecene, 1-dodecene, 1-hexadecene, and 1-octadecene; and trioctylphosphine.

Among these, an aliphatic unsaturated hydrocarbon having 12 or more carbon atoms is preferred, and 1-octadecene is more preferred.

Dissolution Conditions

The method of dissolving the Group III raw material and Group II raw material described above, an optional coordinating molecule, and the like in the first step is not particularly limited, and for example, a method of dissolving the materials by heating them to a temperature of 100° C. to 180° C. is preferred. At this time, it is preferable to remove any dissolved oxygen, moisture, and the like from the mixed solution obtained by dissolution, by heating under reduced pressure conditions.

Furthermore, it is preferable that the time required for dissolution by heating as described above is 30 minutes or longer.

Second Step

The second step is a step of adding a Group V raw material including a Group V element to the mixed solution obtained by dissolving the Group III raw material and the Group II raw material, and forming a core containing the Group III element and the Group V element.

Here, in regard to the production method of the invention, since the Group II raw material is added in the first step, the Group II raw material, which is a raw material for the shell, is present when the core is formed in the second step. However, it is assumed that the Group II raw material is hardly consumed in the formation of the core, and most of the raw materials exist on the surface of the core thus formed.

As such, when the Group II raw material, which is a material for the shell, exists at the time of forming the core, the luminous efficiency of the core-shell particles thus obtainable is further increased. This is speculated to be because when the shell is formed by adding a Group VI raw material in the third step, more uniform coating is formed by causing the Group II raw material and the Group VI raw material existing on the surface of the core to react in advance, and the interface between the core and the shell is slightly non-localized (being in a solid solution state).

Group V Raw Material

Specific examples of the Group V raw material including a Group V element include a tristrialkylsilylphosphine, a trisdialkylsilylphosphine, a trisdialkylaminophosphine; arsenic oxide, arsenic chloride, arsenic sulfate, arsenic bromide, arsenic iodide; nitrogen monoxide, nitric acid, and ammonium nitrate.

Among these, it is preferable to use a tristrialkylsilylphosphine or a trisdialkylaminophosphine, and from the viewpoints of safety, cost, and the like, it is more preferable to use a trisdialkylaminophosphine. Specifically, it is even more preferable to use trisdimethyl aminophosphine.

Heating Conditions

It is preferable to carry out the second step under heating conditions, from the viewpoint of dissolving the Group V raw material described above and increasing the reactivity with the Group III raw material.

Here, the heating temperature is preferably lower than 230° C., from the viewpoint of suppressing the influence of Ostwald ripening and making the particle size of the core uniform.

Furthermore, the heating temperature can be appropriately adjusted using the Group V raw material to be added, and is therefore not particularly limited. However, for example, in a case in which trisdimethylaminophosphine is used, the heating temperature is more preferably from 120° C. to 200° C., and even more preferably from 150° C. to 180° C. When the raw materials are heated to a temperature of from 120° C. to 200° C., non-uniformity of the core to be formed is reduced, and it becomes easier to control the luminescence half-width to a small value.

On the other hand, the heating time can be appropriately adjusted by the particle size of the core, and is therefore not particularly limited. However, when a size of a general core used in quantum dots is considered, it is preferable to perform heating over a time period of from about 0.5 minutes to 120 minutes.

Third Step

The third step is a step of adding a Group VI raw material including a Group VI element to the mixed solution after forming of the core, and forming a shell containing the Group II element and the Group VI element on at least a portion of the surface of the core. This step is a step characterized by being carried out at a temperature of 230° C. or higher.

Group VI Raw Material

Specific examples of the Group VI raw material including a Group VI element include sulfur, an alkylthiol, a trialkylphosphine sulfide, a trialkenylphosphine sulfide, an alkyl aminosulfide, an alkenyl aminosulfide, cyclohexyl isothiocyanate, diethyldithiocarbamic acid; a trialkylphosphine selenide, a trialkenylphosphine selenide, an alkyl aminoselenide, an alkenyl aminoselenide, a trialkylphosphine telluride, a trialkenylphosphine telluride, an alkyl aminotelluride, and an alkenyl aminotelluride.

Among these, for the reason that dispersibility of the core-shell particles thus obtainable is improved, it is preferable to use an alkylthiol. Specifically, it is more preferable to use dodecanethiol or octanethiol, and it is even more preferable to use dodecanethiol.

Heating Conditions

The heating temperature for the third step is 230° C. or higher as described above, and the heating temperature is preferably 240° C. or higher.

In regard to the production method of the invention, when the heating temperature in the third step is adjusted to 230° C. or higher, formation of the shell layer is promoted, and the aforementioned intensity ratio (B/A) becomes 0.25 or higher.

Furthermore, it is preferable that the heating temperature is 250° C. or lower, from the viewpoint of suppressing the production of a non-dispersible precipitate caused by decomposition of the above-mentioned coordinating molecule, or the like.

On the other hand, regarding the heating time, from the viewpoint that the aforementioned intensity ratio (B/A) becomes 0.35 or higher, and the luminous efficiency is further improved, it is preferable to perform heating for one hour or longer at a temperature of 230° C. or higher, and it is more preferable to perform heating for 7 hours or longer.

In regard to the third step of the production method of the invention, the Group II raw material described above may further added, in addition to the Group VI raw material, for the reason that the luminous efficiency is further improved.

Film

The film of the invention is a film containing the core-shell particles of the invention described above.

Such a film of the invention has high luminous efficiency and is useful as quantum dots, and therefore, the film of the invention can be applied to, for example, a wavelength conversion film for display applications, a photoelectric conversion (or wavelength conversion) film for solar cells, a biomarker, and a thin film transistor.

Furthermore, the film material as a matrix material that constitutes the film of the invention is not particularly limited, and the film material may be a resin, or may be a thin glass film.

Specific examples include an ionomer, polyethylene, polyvinyl chloride, polyvinylidene chloride, polyvinyl alcohol, polypropylene, polyester, polycarbonate, polystyrene, polyacrylonitrile, an ethylene-vinyl acetate copolymer, an ethylene-vinyl alcohol copolymer, an ethylene-methacrylic acid copolymer film, and a resin material based on nylon or the like.

EXAMPLES

Hereinafter, the invention will be described in more detail based on Examples. The materials, amounts of use, proportions, details of treatments, treatment procedures, and the like disclosed in the following Examples can be modified as appropriate, as long as the gist of the invention is maintained. Therefore, the scope of the invention is not intended to be construed limitedly by the Examples described below.

Examples 1 to 7 and Comparative Examples 1 to 3

First Step 29.50 mL of oleylamine as a coordinating molecule, 1.20 g (5.4 mmol) of indium chloride as a Group III raw material, and 0.736 g (5.4 mmol) of zinc chloride as a Group II raw material were introduced into a flask, and the content was heated and stirred at 100° C. under reduced pressure conditions to dissolve the raw materials. At the same time, the solution was degassed for 50 minutes.

Second Step

Next, the temperature of the flask was raised to the temperature indicated in the following Table 1 under a flow of nitrogen, and the flask was maintained for 50 minutes.

When the temperature of the solution was stabilized, 1.5 mL (8.27 mmol) of trisdimethylaminophosphine as a Group V raw material was added thereto, and the mixture was heated for 25 minutes in a state in which the temperature indicated in the following Table 1 was maintained.

After heating, the solution was colored in red, and it could be confirmed that particles (core) had been formed.

Third Step

Next, in a state in which the solution containing the core was heated to the temperature indicated in the following Table 1, 17.96 mL of dodecanethiol as a Group VI raw material was added thereto, and the mixture was heated for 7 hours in a state in which the temperature indicated in the following Table 1 was maintained.

Next, the solution thus obtained was cooled to room temperature, subsequently ethanol was added thereto, and the mixture was centrifuged. Thus, particles were precipitated.

The supernatant was discarded, and then the residue was dispersed in toluene solvent. Thus, a solution in which nanoparticles (InP/ZnS) containing In and P in the core and containing Zn and S in the shell were dispersed was prepared.

Intensity Ratio

A sample having a thin film formed thereon by adding each of nanoparticle dispersion liquids thus prepared dropwise onto a non-doped silicon substrate, and drying the nanoparticle dispersion liquid, was used, and the peak intensity ratios of In, P, Zn, and S were measured using an XPS apparatus, Quantera SXM type ESCA (manufactured by Ulvac-PHI, Inc.).

The measurement conditions were as described below, and the proportion of the peak intensity ratio B of the Group II element (Zn) with respect to the peak intensity ratio A of the Group III element (In) is described in the following Table 1 as "Intensity ratio (B/A)", while the proportion of the peak intensity ratio C of the Group VI element (S) with respect to the peak intensity ratio A of the Group III element (In) is described in the following Table 1 as "Intensity ratio (C/A)".

Measurement Condition

X-ray source: Al—Kα radiation (analyzed diameter 100 μm, 25 W, 15 kV)
Photoelectron discharge angle: 45°
Measurement range: 300 μm×300 μm
Compensation: Charging compensation for combined use of an electron gun and a low energy ion gun Luminous Efficiency For each of the nanoparticle dispersion liquids thus prepared, the concentration of the solution was adjusted such that the light absorbance at an excitation wavelength of 450 nm would be about 0.02. The luminous efficiency was measured using an absolute PL quantum yield spectrometer, C9920-02 (manufactured by Hamamatsu Photonics K.K.).

The luminous efficiency in the following Table 1 was calculated as a proportion of the number of emitted photons with respect to the number of absorbed photons.

Luminescence Half-Width

The luminescence half-width was determined by measuring the fluorescence spectrum of each of the nanoparticle dispersion liquids thus prepared, using light having an excitation wavelength of 450 nm at room temperature. Specifically, for the peak intensities of the fluorescence spectrum thus observed, the wavelength equivalent to a half of the intensity was determined for each peak, and the half-width was calculated from the difference between those wavelengths.

TABLE 1

| | Second step Core forming temperature (° C.) | Third step Shell forming temperature (° C.) | Intensity ratio (B/A) *1 | Intensity ratio (C/A) *2 | Luminous efficiency (%) | Luminescence half-width (nm) |
|---|---|---|---|---|---|---|
| Example 1 | 180 | 230 | 0.26 | 0.90 | 26.9 | 56 |
| Example 2 | 180 | 240 | 0.37 | 1.22 | 30.9 | 57 |
| Example 3 | 200 | 240 | 0.38 | 1.05 | 30.5 | 59 |
| Example 4 | 150 | 240 | 0.36 | 0.91 | 29.4 | 56 |
| Example 5 | 220 | 240 | 0.40 | 1.00 | 33.0 | 67 |
| Example 6 | 230 | 230 | 0.29 | 0.95 | 27.2 | 69 |
| Example 7 | 240 | 240 | 0.41 | 1.34 | 31.3 | 71 |
| Comparative Example 1 | 220 | 200 | 0.19 | 0.82 | 10.2 | 56 |
| Comparative Example 2 | 180 | 200 | 0.22 | 0.77 | 12.4 | 57 |
| Comparative Example 3 | 180 | 220 | 0.24 | 0.76 | 21.5 | 57 |

*1 Intensity ratio (B/A): Proportion of peak intensity ratio B of Group II element (Zn) with respect to peak intensity ratio A of Group III element (In)
*2 Intensity ratio (C/A): Proportion of peak intensity ratio C of Group VI element (S) with respect to peak intensity ratio A of Group III element (In)

From the results shown in Table 1, it was understood that when the "intensity ratio (B/A)" representing the proportion of the peak intensity ratio B of the Group II element (Zn) with respect to the peak intensity ratio A of the Group III element (In) was less than 0.25, the luminous efficiency was poor. (Comparative Examples 1 to 3).

In contrast, it was understood that when the intensity ratio (B/A) was 0.25 or higher, the luminous efficiency was high in all cases (Examples 1 to 7).

Furthermore, it was understood from a comparison of Examples 1 to 7 that when the intensity ratio (B/A) was 0.35 or higher, the luminous efficiency was superior in all cases (Examples 2 to 5 and 7).

Also, it was understood from a comparison of Examples 1 to 7 that when the second step was carried out at a temperature of lower than 230° C., the luminescence half-width values became small (Examples 1 to 5). Particularly, from a comparison of Examples 1 to 5, it was understood that when the second step was carried out a temperature of from 120° C. to 200° C., and the third step was carried out at a temperature of 240° C. or higher, the luminescence half-width values became even smaller (Examples 2 to 4).

What is claimed is:

1. Core-shell particles comprising:
   a core containing a Group III element and a Group V element; and
   a shell covering at least a portion of the surface of the core and containing a Group II element and a Group VI element,
   wherein the proportion of the peak intensity ratio of the Group II element with respect to the peak intensity ratio of the Group III element as measured by X-ray photoelectron spectroscopy analysis is from 0.26 to 0.41.

2. The core-shell particles according to claim 1, wherein the proportion of the peak intensity ratio of the Group VI element with respect to the peak intensity ratio of the Group III element as measured by X-ray photoelectron spectroscopy analysis is 0.80 or higher.

3. The core-shell particles according to claim 1, wherein the Group III element is In, and the Group V element is any one of P, N, and As.

4. The core-shell particles according to claim 3, wherein the Group III element is In, and the Group V element is P.

5. The core-shell particles according to claim 1, wherein the Group II element is Zn, and the Group VI element is S or Se.

6. The core-shell particles according to claim 5, wherein the Group II element is Zn, and the Group VI element is S.

7. The core-shell particles according to claim 1, wherein the proportion of the peak intensity ratio of the Group II element with respect to the peak intensity ratio of the Group III element as measured by X-ray photoelectron spectroscopy analysis is 0.35 or higher.

8. A method for producing core-shell particles, the method being used for synthesizing the core-shell particles according to claim 1,
   the method comprising:
   a first step of preparing a mixed solution by mixing a Group III raw material including a Group III element with a Group II raw material including a Group II element, and dissolving the raw materials;
   a second step of adding a Group V raw material including a Group V element to the mixed solution, and forming a core containing the Group III element and the Group V element; and
   a third step of adding a Group VI raw material including a Group VI element to the mixed solution after forming of the core, and forming a shell containing the Group II element and the Group VI element on at least a portion of the surface of the core,
   wherein the third step is carried out at a temperature of 230° C. or higher.

9. The method for producing core-shell particles according to claim 8, wherein the second step is carried out at a temperature of lower than 230° C.

10. The method for producing core-shell particles according to claim 9, wherein the second step is carried out at a temperature of from 120° C. to 200° C.

11. The method for producing core-shell particles according to claim 8, wherein the third step is carried out at a temperature of 240° C. or higher.

12. The method for producing core-shell particles according to claim 8, wherein the Group III element is In, and the Group V element is any one of P, N, and As.

13. The method for producing core-shell particles according to claim 12, wherein the Group III element is In, and the Group V element is P.

14. The method for producing core-shell particles according to claim 8, wherein the Group II element is Zn, and the Group VI element is S or Se.

15. The method for producing core-shell particles according to claim 14, wherein the Group II element is Zn, and the Group VI element is S.

16. The method for producing core-shell particles according to claim 8, wherein the Group III raw material is chloride of In.

17. The method for producing core-shell particles according to claim 8, wherein the Group II raw material is chloride of Zn.

18. The method for producing core-shell particles according to claim 8, wherein the Group V raw material is a trisdialkylaminophosphine.

19. The method for producing core-shell particles according to claim 8, wherein the Group VI raw material is an alkylthiol.

20. A film comprising the core-shell particles according to claim 1.

* * * * *